United States Patent
Hsu et al.

(10) Patent No.: US 10,841,966 B2
(45) Date of Patent: Nov. 17, 2020

(54) NETWORK COMMUNICATION DEVICE, WIRELESS ACCESS POINT, WIRELESS REPEATER

(71) Applicant: Realtek Semiconductor Corporation, Hsinchu (TW)

(72) Inventors: Yi-Shou Hsu, Hsinchu (TW); Kuang-Yu Yen, Zhubei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 116 days.

(21) Appl. No.: 16/113,189

(22) Filed: Aug. 27, 2018

(65) Prior Publication Data
US 2019/0223242 A1    Jul. 18, 2019

(30) Foreign Application Priority Data
Jan. 18, 2018    (TW) ............... 107101916 A

(51) Int. Cl.
| | |
|---|---|
| *H04W 76/15* | (2018.01) |
| *H04B 7/15* | (2006.01) |
| *H04B 7/0404* | (2017.01) |
| *H04W 88/08* | (2009.01) |

(52) U.S. Cl.
CPC .......... *H04W 76/15* (2018.02); *H04B 7/0404* (2013.01); *H04B 7/15* (2013.01); *H04W 88/08* (2013.01)

(58) Field of Classification Search
CPC .... H04W 76/15; H04W 88/08; H04B 7/0404; H04B 7/15
See application file for complete search history.

(56) References Cited

U.S. PATENT DOCUMENTS

| | | | |
|---|---|---|---|
| 2012/0140743 A1* | 6/2012 | Pelletier ............ | H04W 72/0453 370/335 |
| 2018/0097667 A1* | 4/2018 | Yoo ..................... | H04B 17/14 |
| 2018/0152273 A1* | 5/2018 | Kim .................... | H04W 72/046 |
| 2018/0337716 A1* | 11/2018 | Fakoorian ............ | H04B 7/0691 |

* cited by examiner

*Primary Examiner* — Walter J Divito
*Assistant Examiner* — Anthony Luo
(74) *Attorney, Agent, or Firm* — Locke Lord LLP; Tim Tingkang Xia, Esq.

(57) ABSTRACT

A network communication device includes a transceiver circuit and a controller. The transceiver circuit is configured to transmit or receive data via a plurality of antennas. The controller is coupled to the transceiver circuit, and the controller is configured to control the transceiver circuit to establish a transmission channel to provide a connection to a first electronic device. If a number of antennas of the first electronic device is less than a number of the plurality of antennas, the controller is configured to reconfigure the transmission channel as multiple channels, in order to provide the connection to the first electronic device via a first channel of the multiple channels, and the first channel corresponds to at least one first antenna of the plurality of antennas.

13 Claims, 5 Drawing Sheets

NETWORK COMMUNICATION DEVICE, WIRELESS ACCESS POINT, WIRELESS REPEATER

RELATED APPLICATIONS

This application claims priority to Taiwan Application Serial Number 107101916, filed Jan. 18, 2018, which is herein incorporated by reference.

BACKGROUND

Technical Field

The present disclosure relates to a network communication device. More particularly, the present disclosure relates to a wireless station and/or a wireless repeater that have a function of reconfiguring channel.

Description of Related Art

Wireless access points (APs) have been widely employed in various indoor environments to provide wireless network due to its convenient use. In order to increase signal coverage of the wireless network, a repeater is employed to extend the network signal.

However, in current related approaches and communication standard, only one transmission channel is arranged between the wireless station and the repeater or other electronic devices. As such, when the load of the repeater is too heavy, or when the number of the electronic devices connected to the station is too large, the transmission performance of the overall system is significantly decreased.

SUMMARY

Some aspects of the present disclosure are to provide a network communication device that includes a transceiver circuit and a controller. The transceiver circuit is configured to transmit or receive data via multiple antennas. The controller is coupled to the transceiver circuit, and the controller is configured to control the transceiver circuit to establish a transmission channel to provide a connection to a first electronic device. If a number of antennas of the first electronic device is less than a number of the plurality of antennas, the controller is configured to reconfigure the transmission channel as multiple channels, in order to provide the connection to the first electronic device via a first channel of the multiple channels, and the first channel corresponds to at least one first antenna of the plurality of antennas.

Some aspects of the present disclosure are to provide a wireless access point that includes an interface circuit, a transceiver circuit, and a controller. The interface circuit is configured to be connected to a wired network. The transceiver circuit is coupled to the interface circuit, and the transceiver circuit is configured to transfer data to a first electronic device via multiple antennas. The controller is coupled to the transceiver circuit and the interface circuit, and the controller is configured to control the transceiver circuit to provide the internet to the first electronic device. If a number of antennas of the first electronic device is less than the plurality of antennas, the controller is configured to control the transceiver circuit to establish multiple channels, in order to provide a connection to the first electronic device via a first channel of the plurality of channels, and the channels are independent to each other.

Some aspects of the present disclosure are to provide a wireless repeater that includes a transceiver circuit and a controller. The transceiver circuit is configured to be connected with a wireless access point via multiple antennas. The controller is coupled to the transceiver circuit, and the controller is configured to control the transceiver circuit to provide internet to a first electronic device. If a number of antennas of the wireless access point is less than a number of the plurality of antennas, the controller is configured to control the transceiver circuit to establish multiple channels in order to be connected with the wireless access point via a first channel of the plurality of channels, and the channels are independent to each other.

As described above, the network communication device in the present disclosure is able to reconfigure the transmission channel as multiple independent transmission channels according to connection ability of the electronic device in the environment. Accordingly, the load of the single transmission channel can be reduced, and the data throughput of the overall system can be increased. Moreover, the above arrangements are able to be applied to a wireless station and/or a wireless repeater.

BRIEF DESCRIPTION OF THE DRAWINGS

This disclosure can be more fully understood by reading the following detailed description of the embodiments, with reference made to the accompanying drawings as follows.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present embodiments. Furthermore, for simplifying the drawings, some of the conventional structures and elements are shown with schematic illustrations. In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other.

Figure 1:
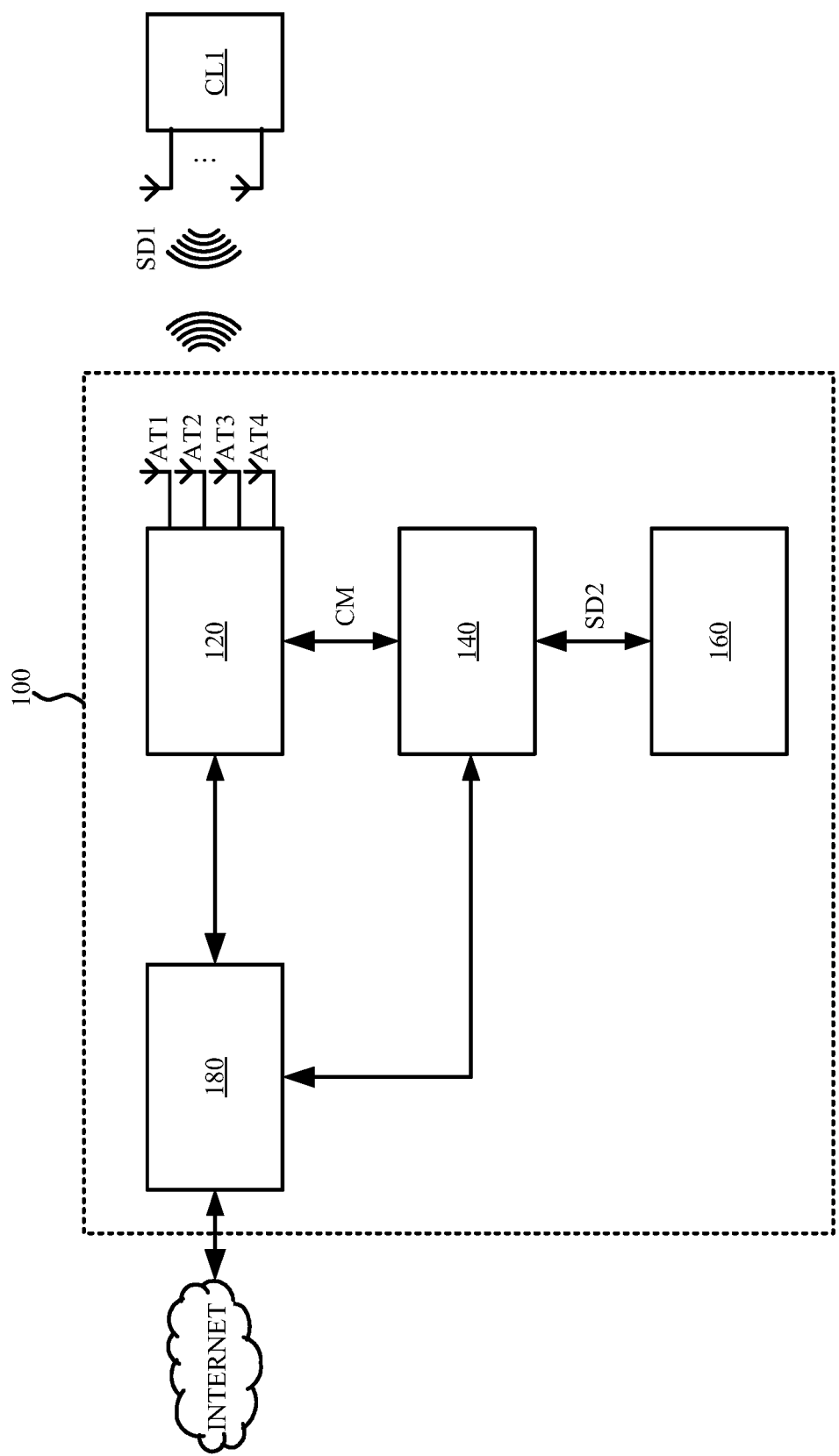
FIG. 1 is a schematic diagram of a network communication device according to some embodiments of the present disclosure.

Reference is now made to FIG. 1. FIG. 1 is a schematic diagram of a network communication device 100 according to some embodiments of the present disclosure.

In some embodiments, the network communication device 100 includes antennas AT1-AT4, a transceiver circuit 120, a controller 140, and a storage unit 160. The transceiver circuit 120 is coupled to the antennas AT1-AT4, in order to transmit/receive data to/from an electronic device CL1 via the antennas AT1-AT4.

In various embodiments, the transceiver circuit 120 may include a baseband circuit and a radio frequency circuit that are configured to process and transmit/receive data. In various embodiments, the electronic device CL1 may be an electronic device with network application, in which the electronic device may be a smart phone, a tablet or a notebook, but the present disclosure is not limited thereto.

The controller 140 is coupled to the transceiver circuit 120 and the storage unit 160. The controller 140 is configured to transmit a control command CM to the transceiver circuit 120, in order to establish a transmission channel. The transceiver circuit 120 is able to establish a connection with the electronic device CL1 via the transmission channel. In some embodiments, when initiating an initial connection, the electronic device CL1 and the network communication device 100 may perform a handshake process to transfer one or more packets carrying certain information to each other. For example, during the handshake process, the electronic device CL1 may transmit predetermined data SD1 to the controller 140. The controller 140 may determine whether the connection from the electronic device CL1 is valid according to information carried on the predetermined data SD1. In some embodiments, the predetermined data SD1 includes device information of the electronic device CL1 (which may include device name, serial number, and a corresponding media access control (MAC) address, etc.), connection authority, and/or a value indicating connection ability of the electronic device CL1 (e.g., a number of antennas of the electronic device CL1).

In various embodiments, the storage unit 160 may be implemented with a register circuit or a memory circuit. The storage unit 160 stores predetermined data SD2 associated with the network communication device 100. In some embodiments, the predetermined data SD2 carry information of a value indicating connection ability of the network communication device 100 (e.g., a number of the antennas AT1-AT4), device information, and/or at least control parameter. In some embodiments, the control parameter may include a service set identifier (SSID), MAC configuration data, a number of the transmission channel, etc. In some embodiments, the controller 140 may configure the transmission channel established by the transceiver circuit 120 according to the at least one control parameter. For example, if the at least one control parameter received by the controller 140 includes two SSIDs, the transceiver circuit 120 may establish two transmission channels according to the two SSIDs, respectively. The at least one control parameter may be used to control RF characteristics and/or baseband characteristics of the transceiver circuit 120, the configuration of the MAC layer, the behavior of the driver, etc. The functions and the types of the at least one control parameter are given for illustrative purposes, but the present disclosure is not limited thereto.

In normal operation, if the controller 140 determines that the connection authority of the electronic device CL1 is valid, the controller 140 may generate a corresponding control command CM according to the predetermined data SD, in order to control the transceiver circuit 120 to establish the transmission channel to provide internet to the electronic device CL1. In some embodiments, if the controller 140 determines that the connection authority of the electronic device CL1 is valid, the controller 140 may compare information indicating the number of the antennas carried on the predetermined data SD1 and information indicating the number of the antennas carried on the predetermined data SD2, in order to determine whether to reconfigure the transmission channel between the transceiver circuit 120 and the electronic device CL1. The operations regarding herein will be described with reference to FIGS. 2A-2B and FIGS. 3A-3B in the following paragraphs.

In some embodiments, the network communication device 100 may be a wireless repeater in FIG. 3A below. Under this condition, the network communication device 100 may be employed to extend signal coverage of a wireless station or a wireless access point (AP).

Figure 2A:
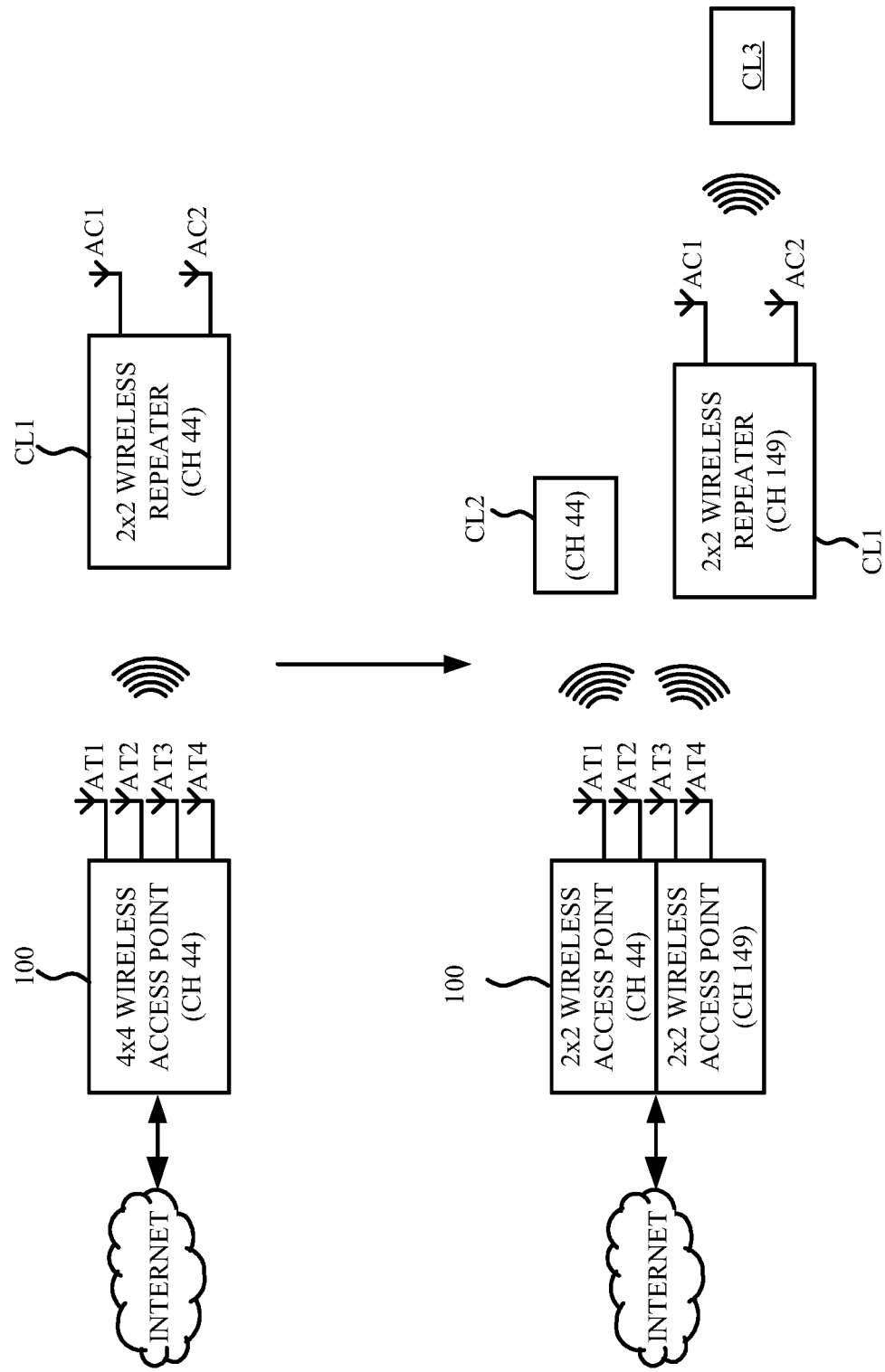
FIG. 2A is a schematic diagram illustrating the operating process of the network communication device in FIG. 1 according to some embodiments of the present disclosure.

Alternatively, in some other embodiments, the network communication device 100 may be a wireless AP as shown in FIG. 2A below. In some embodiments where the network communication device 100 operates as the wireless AP, as shown in FIG. 1, the network communication device 100 further includes an interface circuit 180. The interface circuit 180 is coupled to the controller 140 and the transceiver circuit 120. The interface circuit 180 is coupled to a wired network via a network cable (not shown). Accordingly, the network communication device 100 may convert the wired network to the wireless network, in order to provide internet to the electronic device CL1. In some embodiments, the interface circuit 180 may be implemented with Ethernet network interface card, but the present disclosure is not limited thereto.

Moreover, in various embodiments, the controller 140 may be implemented in hardware, software, firmware, and the combination thereof. For illustration, if speed and accuracy are determined to be paramount, a mainly hardware and/or firmware vehicle is selected and utilized. For example, the hardware may include a microcontroller and/or a corresponding application-specific integrated circuit (ASIC). Alternatively, if flexibility is paramount, a mainly hardware and/or software implementation is selected and utilized. For example, the hardware may include a processing circuit, and the software may include an algorithm corresponding to the method 200 in FIG. 2B below and/or the method 300 in FIG. 3B below. Various arrangements to implement the method 300 are within the contemplated scope of the present disclosure.

The implementations of the controller 140 are given for illustrative purposes. Various implementations for the controller 140 are within the contemplated scope of the present disclosure.

Figure 2B:
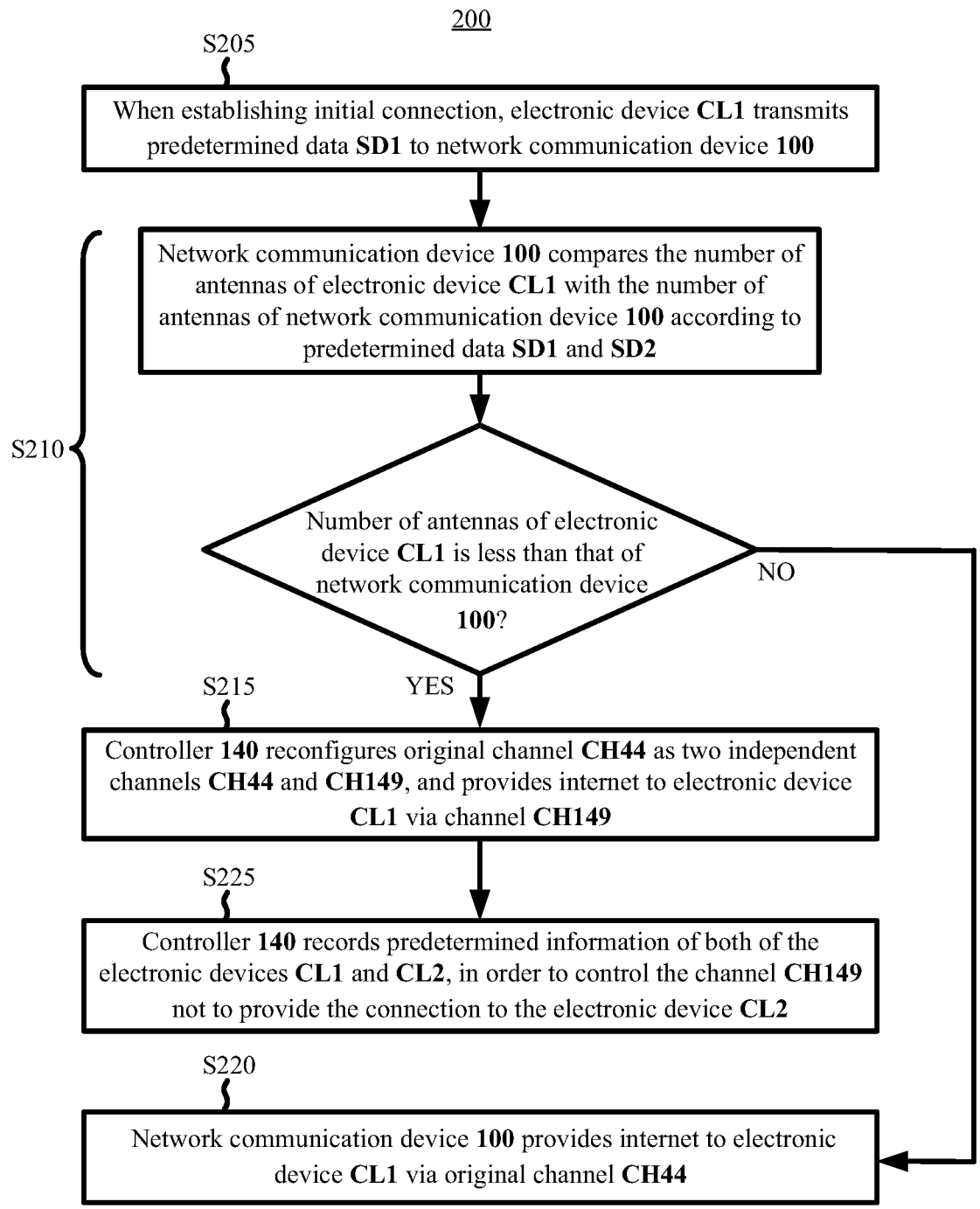
FIG. 2B is a flow chart of a method for reconfiguring channel according to some embodiments of the present disclosure.

Reference is now made to both of FIGS. 2A and 2B. FIG. 2A is a schematic diagram illustrating the operating process of the network communication device 100 in FIG. 1 according to some embodiments of the present disclosure, and FIG. 2B is a flow chart of a method 200 for reconfiguring channel according to some embodiments of the present disclosure. For ease of understanding, like elements in FIG. 2A are designated with the same reference numbers with respect to FIG. 1. In addition, operations of FIG. 2B are described with reference to FIG. 2A.

In this example, as shown in FIG. 2A, the network communication device 100 operates as a 4×4 wireless AP (i.e., having 4 antennas AT1-AT4 for transceiving data), and the electronic device CL1 operates as 2×2 wireless repeater (i.e., having two antennas AC1-AC2 for transceiving data).

As shown in FIG. 2B, the method 200 includes operations S205, S210, S215, S220, and S225. In operation S205, when establishing an initial connection, the electronic device CL1 transmits the predetermined data SD1 to the network communication device 100.

In operation S210, the network communication device 100 compares the number of antennas of the electronic device CL1 with the number of antennas of the network communication device 100 according to the predetermined data SD1 and SD2. If the number of antennas of the electronic device CL1 is less than that of the network communication device 100, operation S215 is performed; otherwise, if the number of antennas of the electronic device CL1 is not less than that of the network communication device 100, operation S220 is performed. In operation S215, the controller 140 reconfigures the original channel CH44 as two independent channels CH44 and CH149, and provides internet to the electronic device CL1 via the channel CH149. In operation S220, the network communication device 100 provides internet to the electronic device CL1 via the original channel CH44.

As described in FIG. 1 above, during the initial connection, the transceiver circuit 120 establishes a single transmission channel CH44 based on the control command CM, in order to establish the connection to the electronic device CL1. In addition, the controller 140 may acquire the number of the antennas of the device 100 (which is 4 in this example) based on the predetermined data SD2. During the connection process, the controller 140 may acquire the number of antennas of the electronic device CL1 (which is 2 in this example) based on the predetermined data SD1 from the electronic device CL1. Accordingly, the controller 140 may compare the connection ability of each device based on the two predetermined data SD1 and SD2.

If the number of the antennas of the electronic device CL1 is not less than that of the network communication device 100, the previously established transmission channel CH44 is kept being used to provide the connection. Alternatively, if the number of the antennas of the electronic device CL1 is less than that of the network communication device 100, as shown in FIG. 2A, the network communication device 100 may reconfigure the original transmission channel as two independent channels CH44 and CH149, in which the channel CH44 corresponds to two antennas AT1-AT2, and the channel CH149 corresponds to the other two antennas AT3-AT4. In some embodiments, based on the control of the controller 140, at least one control parameter of the predetermined data SD2 may be adjusted, such that the transceiver circuit 120 reconfigures the original single channel as the two independent channels CH44 and CH149. In some embodiments, the two independent channels CH44 and CH149 have different MAC addresses, in order to operate as two independent APs equivalently.

As a result, the network communication device 100 is able to be connected with the electronic device CL1 via the channel CH149 and the antennas AT3-AT4, and is able to be connected with another electronic device CL2 via the channel CH44 and the antennas AT1-AT2. As described above, in this example, the network communication device 100 operates as the wireless AP, and the electronic device CL1 operates as the wireless repeater. As shown in FIG. 2A, the electronic device CL1 may extend internet provided from the wireless AP to other clients (e.g., electronic device CL3). Equivalently, the network communication device 100 also provides internet to the electronic device CL3 via the channel CH149.

In some related approaches, the wireless AP only establishes a single channel to provide internet to multiple electronic devices. In other words, the wireless AP and the wireless repeater are required to share the bandwidth of the single channel to provide internet to the multiple electronic devices. As a result, the load of the single channel is too heavy, and the data throughput of the overall system is decreased.

Compared with the above approaches, the network communication device 100 of the present disclosure is able to reconfigure the single channel as multiple independent transmission channels based on the number of the antennas, in order to provide internet to multiple electronic devices via the multiple independent transmission channels respectively. With such arrangement, the wireless station and the wireless repeater are able to transmit data via different transmission channels at the same time. As a result, the data throughput of the overall system is able to be increased.

With continued reference to FIG. 2B, in operation S225, the controller 140 records predetermined information of both of the electronic devices CL1 and CL2, in order to control the channel CH149 not to provide the connection to the electronic device CL2. In some embodiments, the controller 140 may store predetermined information (device name, serial number, MAC address, etc.) of the electronic devices CL1 and CL2 to the storage unit 160, in order to determine whether the connection(s) of the electronic device(s) CL1 and/or CL2 is valid after the two independent channels CH44 and CH149 are configured.

For example, during the initial connection, the controller 140 may acquire the MAC address of the electronic device CL1 and that of the electronic device CL2 based on the predetermined data (i.e., the predetermined data SD1) transmitted from the electronic device CL1s and CL2. Accordingly, after the two independent channels CH44 and CH149 are configured, the controller 140 is able to determine that the connection between the electronic device CL2 and the channel CH149 is invalid according to the MAC address of the electronic device CL2. With such arrangement, the electronic device CL2 is unable to be connected with the channel CH149 based on the control of the controller. As such, the electronic devices CL1 and CL2 are both prevented from being connected with the same channel CH149. As a result, the bandwidth of the two channels CH44 and CH149 are able to be effectively allocated to different electronic devices.

The above example in FIG. 2A where the electronic device CL1 operates as the wireless repeater is given for illustrative purposes, but the present disclosure is not limited thereto. As noted above, the electronic device CL1 may be various electronic devices with internet application.

Figure 3A:
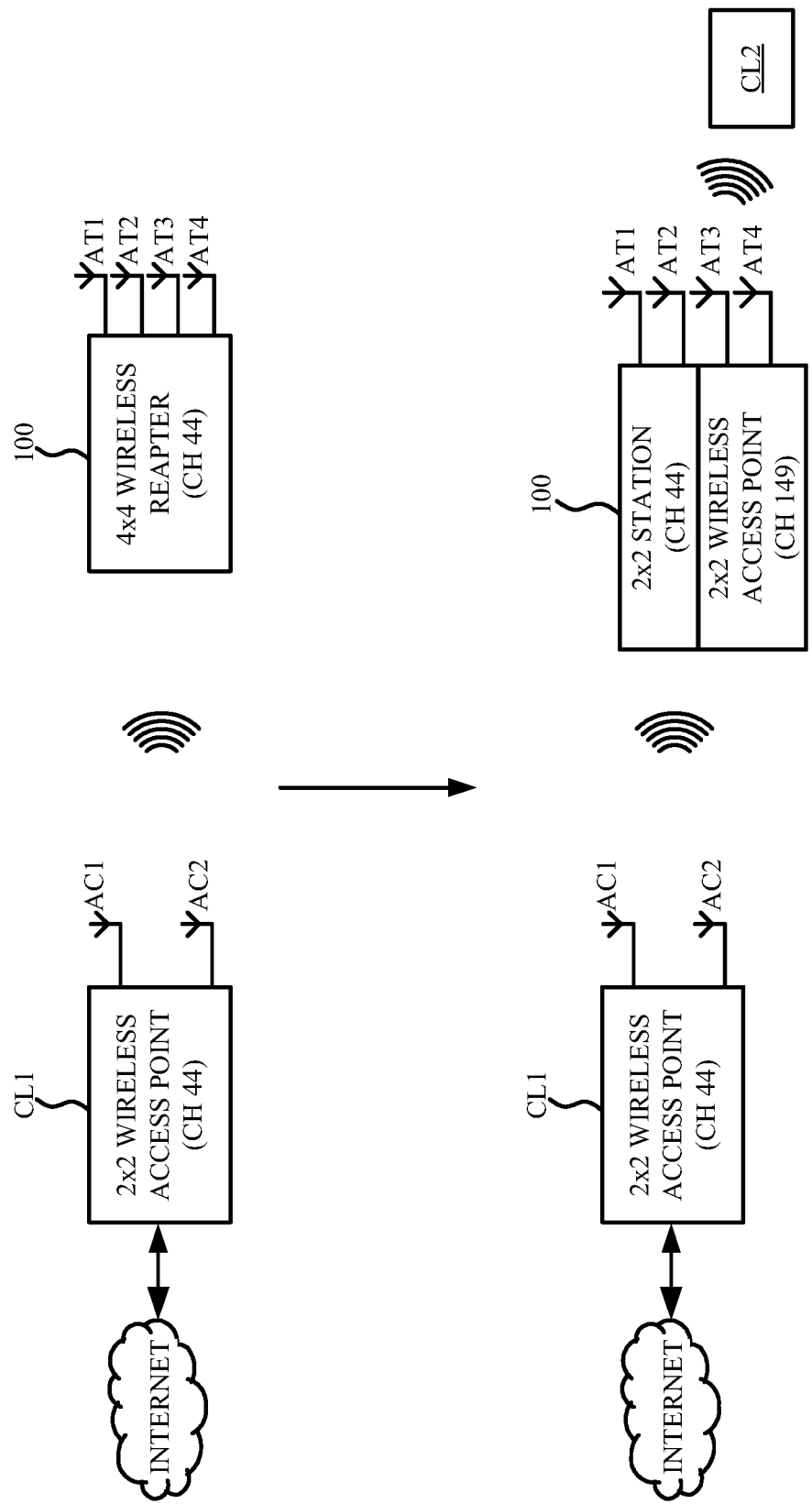
FIG. 3A is a schematic diagram illustrating the operating process of the network communication device in FIG. 1 according to some embodiments of the present disclosure.
Figure 3B:
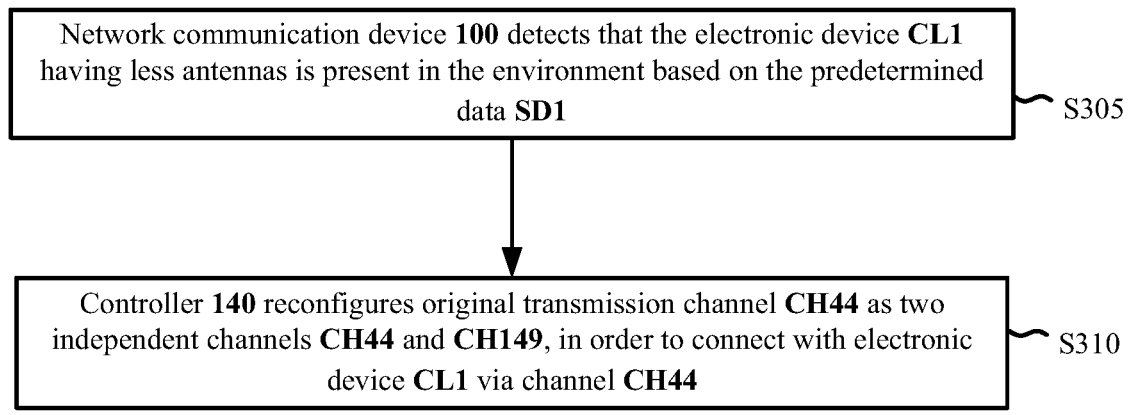
FIG. 3B is a flow chart of a method for reconfiguring channel according to some embodiments of the present disclosure.

Reference is now made to FIGS. 3A and 3B. FIG. 3A is a schematic diagram illustrating the operating process of the network communication device 100 in FIG. 1 according to some embodiments of the present disclosure, and FIG. 3B is a flow chart of a method 300 for reconfiguring channel according to some embodiments of the present disclosure. For ease of understanding, like elements in FIG. 3A are designated with the same reference numbers with respect to FIG. 1. In addition, operations of FIG. 3B are described with reference to FIGS. 1 and 3A.

Compared with FIGS. 2A-2B, in this example, the network communication device 100 operates as 4×4 wireless repeater (i.e., having four antennas AT1-AT4 for transceiving data), and the electronic device CL1 operates as 2×2 wireless AP (i.e., having two antennas AC1-AC2 for transceiving data).

As shown in FIG. 3B, the method 300 includes operations S305 and S310. In operation S305, the network communication device 100 detects that the electronic device CL1 having less antennas is present in the environment based on the predetermined data SD1. In operation S310, the controller 140 reconfigures the original transmission channel CH44 as two independent channels CH44 and CH149, in order to connect with the electronic device CL1 via the channel CH44.

For example, as shown in FIG. 3A, the network communication device 100 detects that the electronic device CL1 having less antennas is able to provide internet based on the predetermined data SD1 from the electronic device CL1. Accordingly, the network communication device 100 may reconfigure the original transmission channel as the independent channels CH44 and CH149, in which the channel CH44 corresponds to the two antennas AT1-AT2 and operates as a station, and the channel CH149 corresponds to the other two antennas AT3-AT4 and operates as AP. As a result, the network communication device 100 is able to be connected with internet via channel CH44 and the electronic device CL1, and to be connected with the other electronic device CL2 via the other channel CH149.

For example, as described above, the network communication device 100 operates as the wireless repeater, and the electronic device CL1 operates as the wireless AP. As shown in FIG. 3A, the channel CH44 operating as the station is connected with to the wireless AP for linking with internet, and the channel CH149 operating as the AP is connected with the other electronic device CL2.

With such arrangement, the two independent channels CH44 and CH149 are able to transmit and/or receive data in the same time. As a result, the transmission performance of the overall system is able to be improved.

In this document, the number of channels and/or the number of the antennas in various device are given for illustrative purposes, and the network communication device and the electronic device that have different number of the antennas are within the contemplated scope of the present disclosure.

As described above, the network communication device in the present disclosure is able to reconfigure the transmission channel as multiple independent transmission channels according to connection ability of the electronic device in the environment. Accordingly, the load of the single transmission channel can be reduced, and the data throughput of the overall system can be increased. Moreover, the above arrangements are able to be applied to a wireless station and/or a wireless repeater.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A network communication device, comprising:
 a transceiver circuit configured to transmit or receive data via a plurality of antennas;
 a controller coupled to the transceiver circuit, and the controller configured to control the transceiver circuit to establish a transmission channel to connect to a first electronic device; and
 a storage unit coupled to the controller, and the storage unit configured to store first predetermined data which is configured to indicate the number of the plurality of antennas of the transceiver circuit,
 wherein the controller is configured to determine the number of the antennas of the first electronic device based on second predetermined data transmitted from the first electronic device, and the controller compares the number of the antenna of the first electronic device with the number of the plurality of antennas of the transceiver circuit according to the first predetermined data and the second predetermined data,
 wherein when the number of the antenna of the first electronic device is less than the number of the plurality of antennas of the transceiver circuit, the controller is configured to reconfigure the transmission channel established by the transceiver circuit to at least two channels, in order to connect to the first electronic device via a first channel of the at least two channels, and connect to a second electronic device via a second channel of the at least two channels,
 wherein the first channel corresponds to at least one first antenna of the plurality of antennas, and the second channel corresponds to at least one second antenna of the plurality of antennas, and the at least one first antenna is different from the at least one second antenna.

2. The network communication device of claim 1, further comprising:
 an interface circuit coupled to the controller and the transceiver circuit, and the interface circuit configured to be connected to internet.

3. The network communication device of claim 1, wherein the controller is further configured to store first information of the first electronic device and second information of the second electronic device, in order to control the first channel not to provide the connection to the second electronic device.

4. The network communication device of claim 1, wherein the first channel and the second channel operate as two independent wireless access points.

5. The network communication device of claim 1, wherein the first channel is further configured to provide internet to a third electronic device via the first electronic device.

6. A wireless access point, comprising:
 an interface circuit configured to be connected to internet;
 a transceiver circuit coupled to the interface circuit, and the transceiver circuit configured to transfer data to a first electronic device via a plurality of antennas;
 a controller coupled to the transceiver circuit and the interface circuit, and the controller configured to control the transceiver circuit to provide the internet to the first electronic device; and
 a storage unit coupled to the controller, and the storage unit configured to store first predetermined data which is configured to indicate the number of the plurality of antennas of the transceiver circuit,
 wherein the controller is configured to determine the number of the antennas of the first electronic device based on second predetermined data transmitted from the first electronic device, and the controller compares the number of the antenna of the first electronic device with the number of the plurality of antennas of the transceiver circuit according to the first predetermined data and the second predetermined data,
 wherein when the number of the antenna of the first electronic device is less than the number of the plurality of antennas of the transceiver circuit, the controller is configured to control the transceiver circuit to establish at least two channels, in order to provide a connection to the first electronic device via a first channel of the at least two channels, and provide a connection to a second electronic device via a second channel of the at least two channels, wherein the plurality of channels are independent to each other.

7. The wireless access point of claim 6, wherein the first channel is further configured to provide the internet to a third electronic device via the first electronic device, and the second channel is configured to provide the internet to the second electronic device.

8. The wireless access point of claim 6, wherein the first channel and the second channel operate as two independent wireless access points.

9. The wireless access point of claim 6, wherein the first channel corresponds to at least one first antenna of the plurality of antennas, the second channel corresponds to at least one second antenna of the plurality of antennas, and the at least one first antenna is different from the at least one second antenna.

10. The wireless access point of claim 7, wherein the controller is further configured to store first information of the first electronic device and second information of the third electronic device, in order to control the first channel not to provide the connection to the third electronic device.

11. A wireless repeater, comprising:
a transceiver circuit configured to be connected with a wireless access point via a plurality of antennas;
a controller coupled to the transceiver circuit, and the controller configured to control the transceiver circuit to provide internet to a first electronic device; and
a storage unit coupled to the controller, and the storage unit configured to store first predetermined data which is configured to indicate the number of the plurality of antennas of the transceiver circuit, wherein the controller is configured to determine the number of the antennas of the wireless access point based on second predetermined data transmitted from the wireless access point, and the controller compares the number of the antennas of the wireless access point with the number of the plurality of antennas of the transceiver circuit according to the first predetermined data and the second predetermined data, wherein when the number of the antennas of the wireless access point is less than the number of the plurality of antennas of the transceiver circuit, the controller is configured to control the transceiver circuit to establish at least two channels in order to be connected with the wireless access point via a first channel of the at least two channels, and connected with a second electronic device via a second channel of the at least two channels, wherein the at least two channels are independent to each other.

12. The wireless repeater of claim 11, wherein the first channel corresponds to at least one first antenna of the plurality of antennas, the second channel corresponds to at least one second antenna of the plurality of antennas, and the at least one first antenna is different from the at least one second antenna.

13. The wireless repeater of claim 12, wherein the first channel operates as a station, and the second channel operates as a wireless access point.

* * * * *